US012251637B2

(12) United States Patent
Tan (10) Patent No.: US 12,251,637 B2
(45) Date of Patent: Mar. 18, 2025

(54) CONTROL METHOD FOR GAME ACCOUNTS, APPARATUS, MEDIUM, AND ELECTRONIC DEVICE

(71) Applicant: NETEASE (HANGZHOU) NETWORK CO., LTD., Zhejiang (CN)

(72) Inventor: Zhou Tan, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 185 days.

(21) Appl. No.: 17/759,016

(22) PCT Filed: Jul. 13, 2020

(86) PCT No.: PCT/CN2020/101731
§ 371 (c)(1),
(2) Date: Jul. 18, 2022

(87) PCT Pub. No.: WO2021/203573
PCT Pub. Date: Oct. 14, 2021

(65) Prior Publication Data
US 2023/0036515 A1    Feb. 2, 2023

(30) Foreign Application Priority Data
Apr. 8, 2020    (CN) .......................... 202010269560.2

(51) Int. Cl.
*A63F 13/79*    (2014.01)
*A63F 13/2145*    (2014.01)
(Continued)

(52) U.S. Cl.
CPC .......... *A63F 13/79* (2014.09); *A63F 13/2145* (2014.09); *A63F 13/533* (2014.09); *A63F 13/73* (2014.09)

(58) Field of Classification Search
CPC ........ A63F 13/45; A63F 13/52; A63F 13/533; A63F 13/70; A63F 13/73; A63F 13/77; A63F 13/79
See application file for complete search history.

(56) References Cited

U.S. PATENT DOCUMENTS

2012/0315981 A1* 12/2012 Gagner ................. G07F 17/326
463/43
2017/0301185 A1 10/2017 Bryant et al.
(Continued)

FOREIGN PATENT DOCUMENTS

CN    101888432 A    11/2010
CN    102368750 A    3/2012
(Continued)

OTHER PUBLICATIONS

International Search Report dated Jan. 8, 2021 of PCT International Application No. PCT/CN2020/101731.
(Continued)

*Primary Examiner* — Omkar A Deodhar
(74) *Attorney, Agent, or Firm* — Qinghong Xu (57) ABSTRACT

A control method for game accounts, a control apparatus for game accounts, a computer-readable medium, and an electronic device are provided. The control method for game accounts comprises: obtaining account information for a plurality of login accounts, and generating account control widgets corresponding to the login accounts according to the account information, wherein said login accounts comprise a controlled account and non-controlled accounts (S210); displaying the account control widgets on a graphical user interface, and displaying a first game interface corresponding to the controlled account (S220); in response to a first trigger control operation used on the account control widgets, selecting a target account from among the non-controlled accounts according to the first trigger control opera-
(Continued)

tion, and switching the first game interface to a second game interface corresponding to the target account (S230).

17 Claims, 6 Drawing Sheets

(51) Int. Cl.
*A63F 13/533* (2014.01)
*A63F 13/73* (2014.01)

(56) References Cited

U.S. PATENT DOCUMENTS

2018/0161675 A1* 6/2018 Miron .................. A63F 13/822
2019/0321732 A1* 10/2019 Zimring ................ A63F 13/355

FOREIGN PATENT DOCUMENTS

| | | |
|---|---|---|
| CN | 103036850 A | 4/2013 |
| CN | 104580451 A | 4/2015 |
| CN | 105553968 A | 5/2016 |
| CN | 106110659 A | 11/2016 |
| CN | 107096226 A | 8/2017 |
| CN | 109224452 A | 1/2019 |
| KR | 20130099429 A | 9/2013 |

OTHER PUBLICATIONS

First Office Action dated Dec. 22, 2020 of Chinese Patent No. 202010269560.2.

* cited by examiner

FIG.1

```
acquiring account information of a plurality of login accounts, and      S210
generating an account-control control corresponding to the login account
according to the account information, and the login account including a
            control account and a non-control account
```

```
                                                                         S220
displaying the account-control control on a graphical user interface, and
   displaying a first game interface corresponding to the control account
```

```
                                                                         S230
in response to a first touch operation acting on the account-control control,
  selecting a target account from the non-control account according to the
 first touch operation, and switching the first game interface into a second
       game interface corresponding to the target account
```

CONTROL METHOD FOR GAME ACCOUNTS, APPARATUS, MEDIUM, AND ELECTRONIC DEVICE

CROSS-REFERENCE

This application is the 371 application of PCT Application No. PCT/CN2020/101731, filed on Jul. 13, 2020, which is based on and claims a priority to and benefits of Chinese Patent Application No. 202010269560.2, entitled "CONTROL METHOD FOR GAME ACCOUNTS, APPARATUS, MEDIUM, AND ELECTRONIC DEVICE", filed on Apr. 8, 2020, the entire content of which is incorporated herein by reference.

TECHNICAL FIELD

The present disclosure relates to a technical field of computer application, and more particularly, to a game account control method, a game account control apparatus, a computer-readable medium and an electronic device.

BACKGROUND

Figure 1:
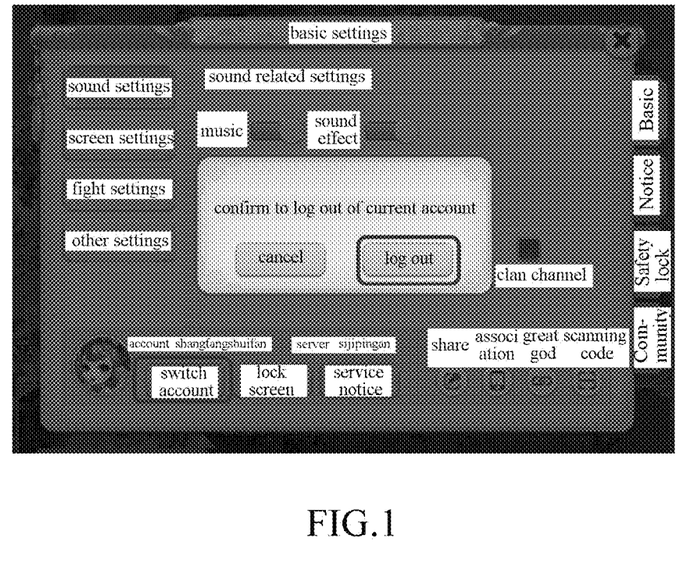
FIG. 1 schematically shows an account switching mode in a prior art.

Client application on terminal device all need to control data through a user account, while current client applications may only log into one account on the same device. For example, in a game application, players may only select one game account at a time to have a gameplay experience. If a user needs to control other account, he/she has to switch account through an account switching system in the application. For example, as shown in FIG. 1, the user needs to click a "switching account" button to log out of the current account, and then return to a login page to log into the other account, which is cumbersome and not convenient to operate.

It should be noted that information disclosed above is merely configured to enhance understanding of background of the present disclosure, which may include information that does not constitute a prior art known to those skilled in the related art.

SUMMARY

The present disclosure provides a game account control method, a game account control apparatus, a non-transitory computer-readable medium and an electronic device.

According to an aspect of the present disclosure, a game account control method is provided and includes: acquiring account information of a plurality of login accounts, generating account-control widgets corresponding to the login accounts according to the account information, wherein the login accounts comprises a control account and a non-control account; displaying the account-control widgets on the graphical user interface, and displaying a first game interface corresponding to the control account; in response to a first touch operation acting on the account-control widget, selecting a target account from the non-control account according to the first touch operation, and switching the first game interface into a second game interface corresponding to the target account.

The present disclosure further discloses a game account control apparatus, including: an account acquisition module configured to acquire account information of a plurality of login accounts, and generating account-control widgets corresponding to the login accounts according to the account information, wherein the login accounts comprises a control account and a non-control account; an interface display module configured to display the account-control widgets on the graphical user interface and displaying a first game interface corresponding to the control account; the account switching module configured to respond to a first touch operation acting on the account-control widget, selecting a target account from the non-control account according to the first touch operation, and switching the first game interface to a second game interface corresponding to the target account.

The present disclosure further discloses one or a plurality of machine-readable media having instructions stored thereon, when the instructions executed by one or a plurality of processors, the processor is arranged to execute steps of: acquiring account information of a plurality of login accounts, generating an account-control widgets corresponding to the login accounts according to the account information, wherein the login accounts comprises a control account and a non-control account; displaying the account-control widgets on the graphical user interface, and displaying a first game interface corresponding to the control account; in response to a first touch operation acting on the account-control widget, selecting a target account from the non-control account according to the first touch operation, and switching the first game interface into a second game interface corresponding to the target account.

The present disclosure further discloses an electronic device, including one or a plurality of processors; and one or a plurality of machine-readable media having instructions stored thereon. When executed by the one or more processors, the electronic device is arranged to execute steps of: acquiring account information of a plurality of login accounts, generating account-control widgets corresponding to the login accounts according to the account information, wherein the login accounts comprises a control account and a non-control account; displaying the account-control widgets on the graphical user interface, and displaying a first game interface corresponding to the control account; in response to a first touch operation acting on the account-control widget, selecting a target account from the non-control account according to the first touch operation, and switching the first game interface into a second game interface corresponding to the target account.

It should be understood that the above general description and the following detailed description are only exemplary and explanatory and should not limit the present disclosure.

BRIEF DESCRIPTION OF THE DRAWINGS

Drawings herein are incorporated into and constitute a part of the specification, illustrate embodiments consistent with the present disclosure, and serve to explain principles of the present disclosure with the specification. It is obviously that the drawings below are merely some embodiments of the present disclosure. For those of ordinary skill in the art, other drawings may be further acquired based on these drawings without creative effort, in which.

DETAILED DESCRIPTION

To make the above objects, features and advantages of the present disclosure more obvious and easier to understand, the present disclosure is further described in detail below with reference to the accompanying drawings and specific embodiments.

Figure 2:
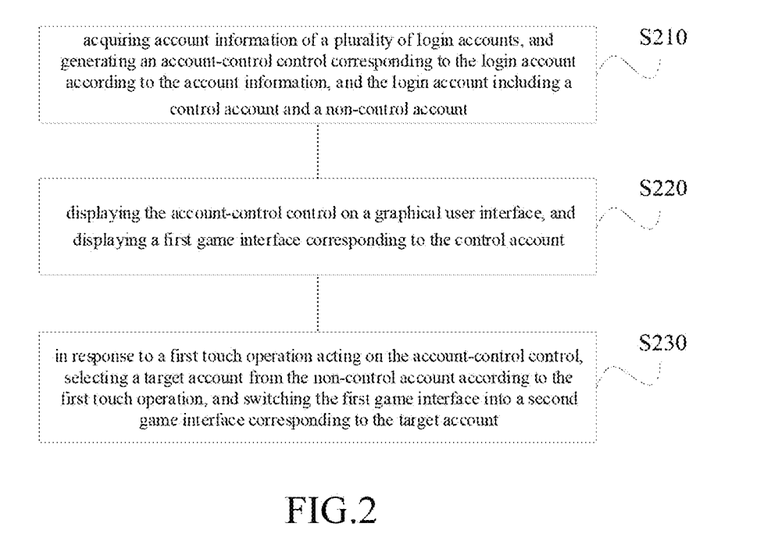
FIG. 2 schematically shows a flowchart of a game account control method according to an embodiment of the present disclosure.

An embodiment first provides a game account control method. Referring to FIG. 2, the game account control method may include the following steps:

step S210: acquiring account information of a plurality of login accounts, and generating account-control widgets corresponding to the login accounts according to the account information, and the login accounts including a control account and a non-control account;

step S220: displaying the account-control widgets on a graphical user interface, and displaying a first game interface corresponding to the control account;

step S230: in response to a first touch operation acting on the account-control widget, selecting a target account from the non-control account according to the first touch operation, and switching the first game interface into a second game interface corresponding to the target account.

In the game account control method provided by the embodiment of the present disclosure, a plurality of login accounts may be displayed on the same user interface through the account-control widgets, and the account-control widgets may be switched through the touch operation of a user, such that the game interface corresponding to the target account determined by the user may be switched and displayed without logging out of the account and logging in again, which may simplify the operation process and thus improve efficiency of the account switching. Moreover, the display of a plurality login accounts on the same user interface may enhance data interaction between the login accounts, reduce data response time, so as to improve data interaction efficiency. In addition, the plurality of login accounts may be flexibly switched therebetween through the touch operation of the user, so as to meet user's requirements and improve user's experience.

The above steps of the present embodiment will be described in more detail below.

In step S210, acquiring account information of a plurality of login accounts, and generating account-control widgets corresponding to the login accounts according to the account information, and the login accounts including a control account and a non-control account.

Figure 3:
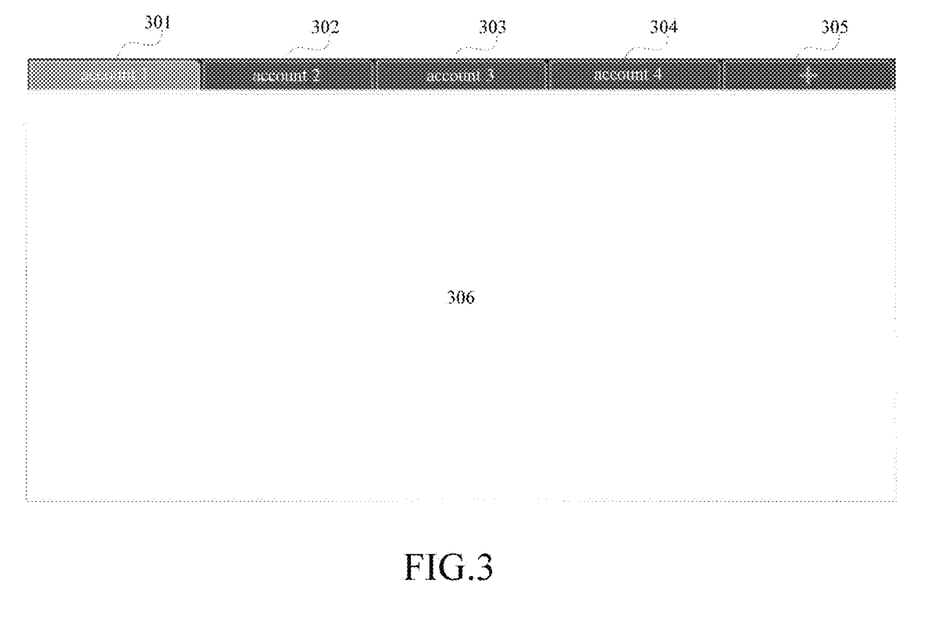
FIG. 3 schematically shows a display effect view of a user interface according to an embodiment of the present disclosure.

The account information of the login account may be identification information configured to login a game client, such as identification code, user name, etc. The user may log in to the game client through the account information, so as to acquire game data of the login account through the login account, and then generate the game interface corresponding to the login account. In the present embodiment, a plurality of account information input by the user may be acquired on a login interface of the game application, or the account information of all login accounts that the user has logged in history may be acquired through historical data saved on a terminal device, or it is possible to acquire the account information of other accounts bound to the login account through the account information of the user's currently logged-in account, so as to acquire the account information of the plurality of login accounts of the user. The user may determine number of the login accounts to be logged in according to configuration of the terminal device. According to the login account, the corresponding game data may be acquired from a server or a local directory of the game application. The game data may include the game interface or data required to generate the game interface, such as pictures, models, virtual scenes, etc., so as to acquire the game interface. The account information of each login account may be configured to generate the account-control widget corresponding to each login account. The account-control widget refers to a touch area that is configured to trigger display of the game interface in response to the touch operation of the user. The user may click different account-control widgets to display different game interfaces, and content of the game interface displays content of a game corresponding to the login account and functional widget for game control, such as mobile joystick widget, skill joystick widget, backpack widget, mall widget, etc. Number and type of functional widgets may be related to game progress corresponding to the login account. The account information corresponding to each login account may serve as display content of each account-control widget to generate the plurality of account-control widgets. For example, the account-control widget may be implemented through a tab tool. As shown in FIG. 3, tabs 301, 302, 303 and 304 may be generated in a graphical user interface, and each tab corresponds to one login account. When a tab is clicked, the game interface of the login account corresponding to the tab may be displayed on an area shown in 306, and content displayed in 306 is switched simultaneously while a different tab is switched. Moreover, a 305 tab may be further generated to continue adding a login account to meet user's requirements.

In step S220, displaying the account-control widgets on a graphical user interface, and displaying a first game interface corresponding to the control account.

A plurality of account-control widgets may be displayed on a top area of the graphical user interface or a left side of the graphical user interface, and the first game interface may be displayed in a main area in middle of the graphical user interface. In some embodiments, the first game interface may be filled into the entire graphical user interface, and that is, display size of the first game interface is equal to size of the graphical user interface, and the plurality of account-control widgets hoveringly display on an upper layer of the first game interface, so as to ensure the clear display of the game interface. In addition, the account-control widget and the game interface may also be displayed in other styles. For example, the account-control widget are displayed at a bottom of the user interface as a short bar, while the game interface occupies the remaining area of the user interface for display, which is not particularly limited in the present embodiment.

Exemplarily, the displayed graphical user interface is shown in FIG. 3, the plurality of account-control widgets are displayed at top of the graphical user interface, and the game interface corresponding to the account-control widget "account 1" is displayed on area 306 of the graphical user interface, i.e., the first game interface.

Figure 4:
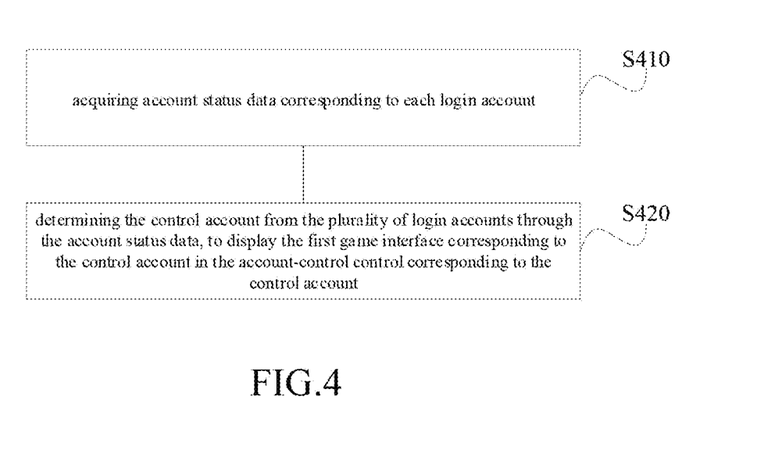
FIG. 4 schematically shows a flowchart of a game account control method according to an embodiment of the present disclosure.

The plurality of login accounts may include control accounts and non-control accounts. The first game interface is the game interface corresponding to the control account. The control account may be randomly selected from the plurality of login accounts, or the first or last login may be selected as the control account according to login time sequence of each login account. In addition, the control account may also be determined by other means. In some embodiments, the method may include the following steps S410 and S420, as shown in FIG. 4, in which:

in step S410, acquiring account status data corresponding to each login account. The account status data may include login status of current login account, such as login time, login duration, etc., may further include historical login information of the login account, such as number of logins in a week, total login duration, etc., and may further include other information, such as account attribute information, which is not limited in the present embodiment. The account status data may be acquired from log of the terminal device, or the account status data corresponding to each login account may be acquired from the server. In addition, a time interval may be set to acquire the account status data at the time interval and keep the account status data synchronized with the data on the server, such as getting the account status data every 10 minutes.

In step S420, determining the control account from the plurality of login accounts through the account status data, so as to display the first game interface corresponding to the control account on the account-control widget corresponding to the control account. The account status data corresponding to each login account is acquired, so as to select the login account of which the account status data meets requirements as the control account. For example, the login account of which total login duration exceeds 10 hours is selected as the control account. After the control account is determined, the remaining login accounts are non-control accounts, the game interface corresponding to the control account may be loaded to display the game interface corresponding to the control account on the graphical user interface, and the game interface corresponding to the non-control account may be saved first and then be loaded to display when the account is switched.

In the present embodiment, the account-control widget corresponding to the control account may be displayed differently to prompt the account-control widget corresponding to the currently displayed first game interface for user. As shown in FIG. 3, the first game interface is displayed on area 306, and the corresponding account-control widget "account 1" is displayed in highlight.

Figure 5:
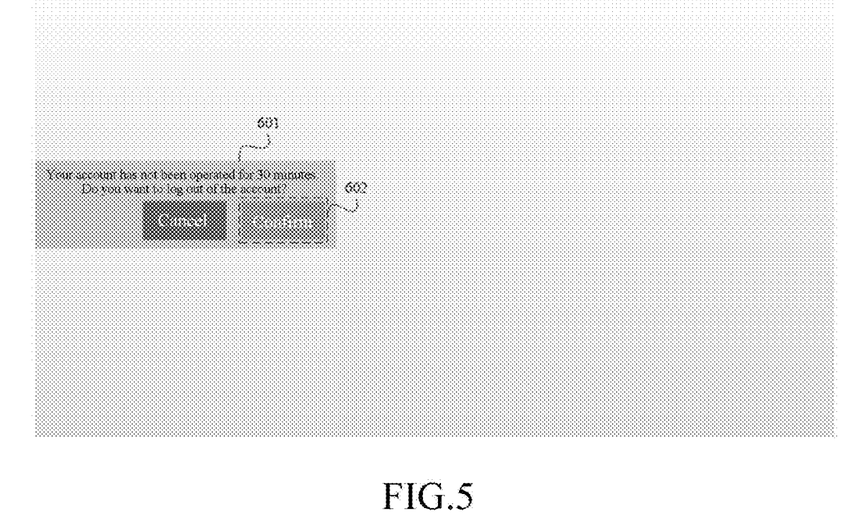
FIG. 5 schematically shows a display effect view of a prompt message according to an embodiment of the present disclosure.

Since the currently displayed first game interface is the user's current operation interface, and the game interface corresponding to other non-control accounts is not displayed, a pop-up window may be displayed on the currently displayed first game interface to determine whether to keep other non-control accounts online, so as to avoid players ignoring other login accounts, and further cause unnecessary consumption of computing resources. Thus, in an embodiment, a prompt message may be displayed on the graphical user interface according to the account status data, so as to prompt the user to switch to or log out from a third game interface corresponding to the non-control account. Exemplarily, the login duration in the account status data of the non-control account may be detected to judge whether the login duration meets the requirements. If the requirements are met, a prompt message may pop up to prompt the user to switch to the non-control account or log out of the non-control account. The prompt message may be displayed in a way of the pop-up window, and the pop-up window may further include a trigger button, such as a button. When triggering the button, the user may switch to the game interface corresponding to the corresponding non-control account, or log out of the corresponding non-control account. In addition, the current login duration of each non-control account from the account status data may be acquired, and the prompt message is generated through the login duration. For example, the prompt message may be "account 2 has been logged in for 30 minutes". In some embodiments, the user's last operation time from the account status data may be pulled out, so as to calculate time difference between the user's last operation time and the current time, and generate the prompt message through the time difference. For example, content of the prompt message may be that "your account 2 has not operated for 30 minutes", etc. For example, as shown in FIG. 5, a prompt message 601 is displayed on the user interface to prompt the user whether to log out of account 2. If the user clicks a button 602, the account-control widget "account 2" may be deleted.

Figure 6:
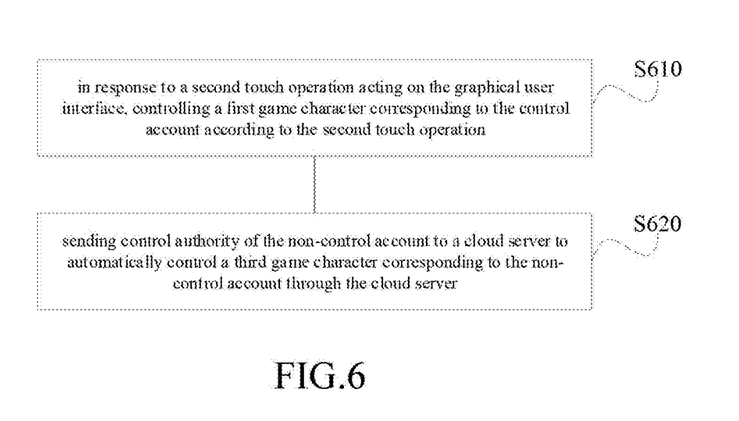
FIG. 6 schematically shows a flowchart of a game account control method according to an embodiment of the present disclosure.

For the currently displayed first game interface, the user may perform game operations on the game interface, such as moving, fighting, sending messages to friends, etc. For other non-control accounts that are not displayed currently, since the corresponding game interface has not been displayed, the server may automatically control a game character that is controlled by the user. Thus, in the embodiment, the game account control method may include the following steps S610 and S620, as shown in FIG. 6, in which:

In step S610, in response to a second touch operation acting on the graphical user interface, controlling a first game character corresponding to the control account according to the second touch operation. In the present embodiment, the second touch operation may include clicking, dragging, etc., and may further include other operations, such as heavy clicking, long pressing, etc., which is not specially limited in the present embodiment. When the second touch operation is detected, the first game character may be controlled according to a control mode corresponding to the second touch operation. For example, when receiving the user's sliding operation acting on a mobile joystick widget in the graphical user interface, the first game character may be controlled to move to a corresponding direction according to the direction of the sliding operation.

In step S620, sending control authority of the non-control account to a cloud server to automatically control a third game character corresponding to the non-control account through the cloud server. Exemplarily, a client may detect user's selection. For example, the user selects to open/close control permission, etc., so as to determine the control permission of the non-control account, and then sends the control permission to the server. In addition, the server may also actively acquire the automatic control permission for each non-control account through permission acquisition request. For example, a selection box may be added to the login interface, and content of the selection box may be as "authorization automatic control". When entering the login account, the user may check the selection box to grant the automatic control permission to the client application. In some embodiments, the server may send the permission acquisition request to the user interface for the user to click to confirm, so as to acquire the automatic control permission for the non-control account, which is not limited in the present embodiment.

If the automatic control permission of the non-control account is acquired, the game character (the third game character) controlled by the user corresponding to the non-control account may be automatically controlled, such as controlling the game character to move, complete specific tasks, fighting, etc., so as to maintain online status of the login account. It should be understood that since the game interface corresponding to the non-control account is not displayed, behavior of the game character controlled by the automatic control authority is not shown, either, and the game data of the login account may be updated on the server to record the behavior of the game character. For the server, data may be calculated through cloud server, server cluster and other technologies, and for the client application, there is no need to calculate the game character corresponding to the login account, which will not cause pressure on the client application.

Continuing to refer to FIG. 2, in step S230, in response to a first touch operation acting on the account-control widget, selecting a target account from the non-control account according to the first touch operation, and switching the first game interface into a second game interface corresponding to the target account.

The first touch operation may refer to user behavior received on the graphical user interface, such as clicking operation, dragging operation, voice inputting operation, etc. The first touch operation is detected through the graphical user interface. If the first touch operation is detected, the account-control widget corresponding to the first touch operation is determined, so as to determine the target account corresponding to the account-control widget. If the widget of the target account is the same as the widget corresponding to the control account, the first game interface is the same as the second game interface, and there is no need to switch. If the target account is one of the non-control accounts, the corresponding second game interface is different from the currently displayed first game interface, and the second game interface is displayed on the account-control widget corresponding to the target account. That is, when the first game interface is switched to the second game interface, the target account may be switched from the non-control account to the control account, and the original control account corresponding to the first game interface may be served as the non-control account again. Exemplarily, as shown in FIG. 3, the first game interface corresponding to the account-control widget 301, and the control account corresponding to the account-control widget 301 are currently displayed, and the account-control widget 302, account-control widget 303 and account-control widget 304 correspond to the non-control accounts, respectively. The user may click the account-control widget 302 at the top, and when the user's click behavior is detected, the first game interface may be switched to the second game interface corresponding to the account-control widget 302. In the present embodiment, the user may flexibly switch among different login accounts through the graphical user interface of the game client. When the target account is switched from the non-control account to the control account, the game data corresponding to the target account may be quickly loaded from the cloud service to the local client, so as to further display the second game interface of the target account on the local client for the user to control the game character in the game interface, and the game interface of another login account may be switched without logging out of the client and logging in again, thereby reducing operation process of account switching and improve operation efficiency. Especially for game applications with waiting time, such as turn-based games, not only the efficiency of account switching is improved, but the efficiency of game control is improved.

Figure 7:
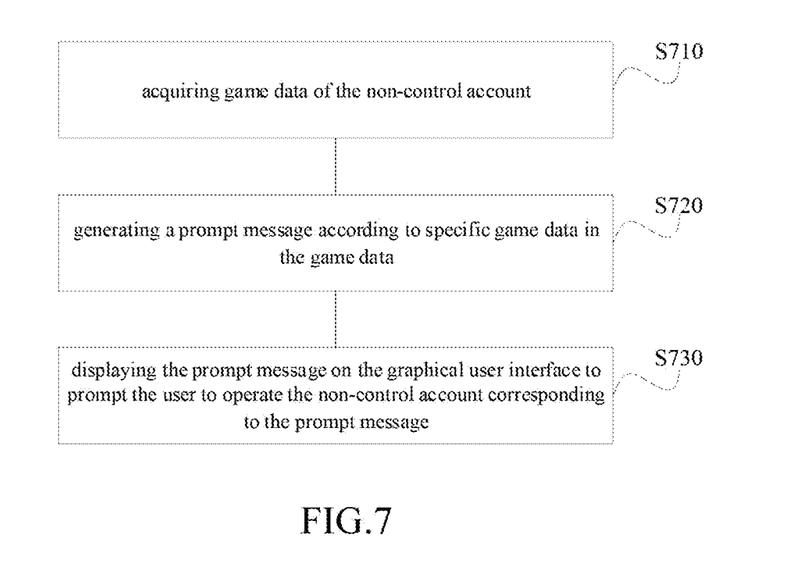
FIG. 7 schematically shows a flowchart of a game account control method according to another embodiment of the present disclosure.

In the embodiment, the game character corresponding to the non-control account that is not displayed may be controlled through the control permission, such that the game data corresponding to the non-control account on the server is updated. If the target account corresponding to the first touch operation is detected, the game data corresponding to the target account may be acquired from the server, and the second game interface is generated by rendering the game data and displayed on the graphical user interface. Since the user cannot switch to another game interface in time, in the present embodiment, a prompt may also be displayed on the account-control widget such that the user may timely respond to the game interface that needs to respond. In some embodiments, the method may include the following steps S710, S720, and S730, as shown in FIG. 7, in which:

In step S710, acquiring game data of the non-control account. In the present embodiment, the control account and non-control account may be identified through specific identification, such that the current control account and non-control account may be determined through the identification, so as to further acquire the game data of the non-control account.

In step S720, generating a prompt message according to a preset game data. In some embodiments, conditions, such as cheating script detection, triggering random fighting event, triggering forced duel event, receiving friend message, etc., requiring the user to respond or to be reminded of may be pre-defined, then the game data corresponding to each login account in real time is monitored, and the game data meeting the conditions is taken as specific game data. The specific game data may be utilized to generate the prompt message, and if a plurality of game data meet the conditions, the plurality of specific game data may generate corresponding prompt messages, respectively. For example, for game data A corresponding to a login account 1, game data B corresponding to login account 2, and game data C corresponding to login account 3, if both the game data A and B meet the conditions, the game data A and B generate the corresponding prompt messages, respectively.

Figure 8:
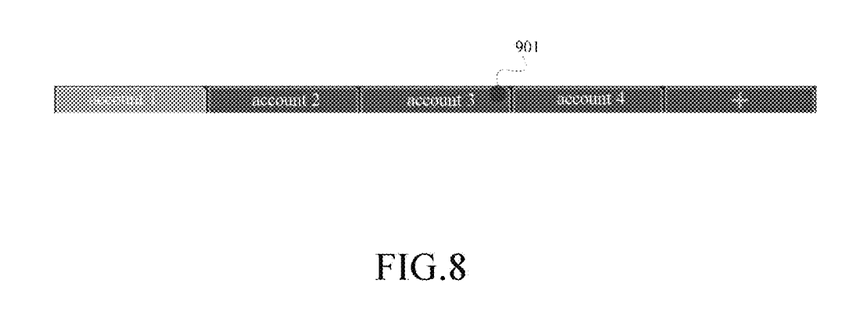
FIG. 8 schematically shows a display effect view of a prompt identifier according to an embodiment of the present disclosure.

In step S730, displaying the prompt message on the graphical user interface to prompt the user to operate the non-control account corresponding to the prompt message. The prompt message may be displayed on the account-control widget corresponding to the control account or the first game interface for user's operation. In addition, the prompt message may also be displayed on the account-control widget of the non-control account corresponding to the specific game data. The prompt message may be indicated by a prompt identifier, which may include a picture, a word and a symbol, or other forms of information, such as highlighting, flashing, etc., which is not specially limited in the present embodiment. Exemplarily, as shown in FIG. 8, if a message sent from a friend is detected in the game data of a non-game account corresponding to the account-control widget "account 3", a circular identifier 901 for indicating the message sent from friend may be displayed on the account-control widget "account 3" corresponding to the game data. In addition, if a plurality of prompt messages are included, different prompt identifiers may be displayed in each account-control widget according to different conditions or rules that each specific game data meets. For example, a red identifier is displayed when condition 1 is met, a yellow identifier is displayed when condition 2 is met, etc.

Figure 9:
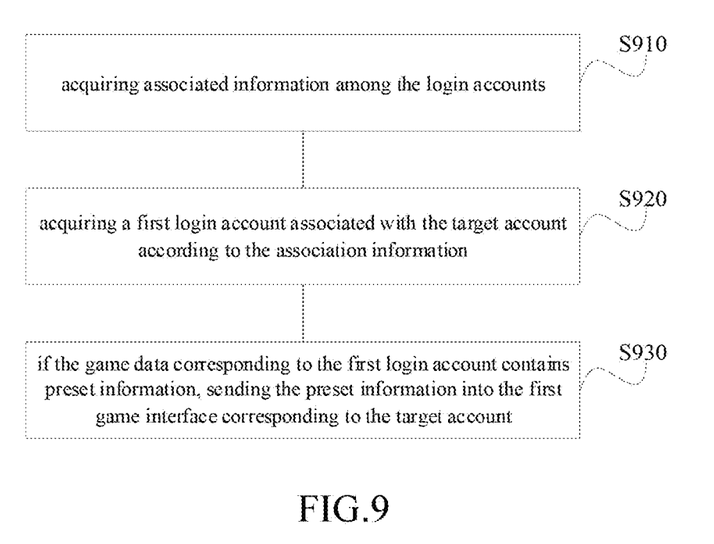
FIG. 9 schematically shows a flowchart of a game account control method according to an embodiment of the present disclosure.

In the embodiment, the method may further include step S910, step S920, and step S930, as shown in FIG. 9:

In step S910, acquiring associated information of the login accounts. User may set one or a plurality of associated accounts for each login account. For example, login account A is an associated account of login account B, and the terminal device or server may record the associated accounts of each login account and generate associated information. Thus, the association information may be acquired from the server or locally from the terminal device.

In step S920, acquiring a first login account associated with the target account according to the association information. Exemplarily, if the user interface currently displays the first game interface of the control account, other non-control account associated with the control account is acquired from the associated information as the first login account. If the user interface currently displays the second game interface, the account associated with the target account corresponding to the second game interface is acquired as the first login account.

In step S930, in response to determining that the game data corresponding to the first login account contains preset information, sending the preset information to the first game interface corresponding to the target account. Exemplarily, the preset information may include a friend message. If a friend of the first login account sends a message to the first login account, the message may be detected by monitoring the game data of the first login account in real time, such that the message is sent to the first game interface for the user to view. Through the present embodiment, user may process and view the messages of other login accounts on the currently displayed game interface, so as to assist the user to understand game progress of each login account, avoid missing important messages, and better control the plurality of login accounts. In addition, the preset information may further include other information, such as announcement message, system prompt message, etc., which is not specially limited in the present embodiment.

In other embodiments of the disclosure, the currently displayed game interface of the control account may also respond to the game data corresponding to other non-control accounts, such as replying to friend messages of the non-control account, logging out of the non-control login account, etc., which falls into the protection scope of the disclosure.

Further, in the present embodiment, a game account control apparatus for executing the game account control method described above is further provided in the present disclosure. The apparatus may be applied to a server or a terminal device.

Figure 10:
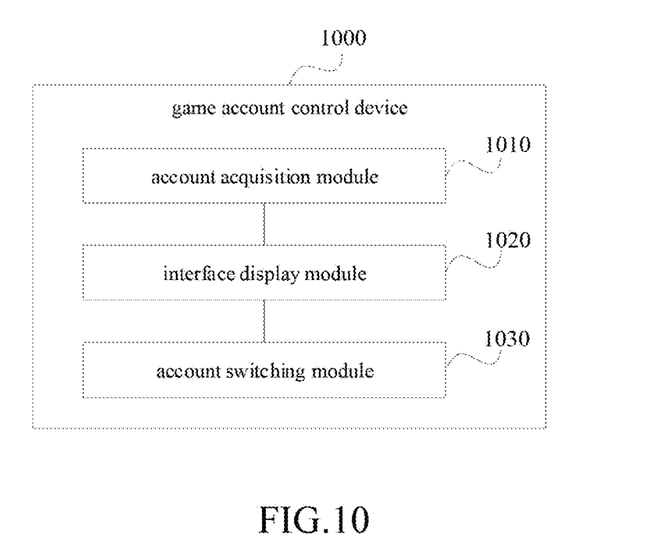
FIG. 10 schematically shows a block diagram of a game account control apparatus according to an embodiment of the present disclosure.

As shown in FIG. 10, the game account control apparatus 1000 may include an account acquisition module 1010, an interface display module 1020, and an account switching module 1030, in which:
  the account acquisition module 1010 is configured to acquire account information of a plurality of login accounts, and generate account-control widgets corresponding to the login accounts according to the account information, and the login accounts includes a control account and a non-control account;
  the interface display module 1020 is configured to display the account-control widgets on a graphical user interface and display a first game interface corresponding to the control account;
  the account switching module 1030 is configured to respond to a first touch operation acting on the account-control widget, select a target account from the non-control account according to the first touch operation, and switch the first game interface to a second game interface corresponding to the target account.

In an embodiment of the present disclosure, the interface display module 1020 may include an account determination unit, in which:
  the account determination unit is configured to determine the control account according to the account information of each login account, so as to display the first game interface corresponding to the control account on the account-control widget corresponding to the control account.

In an embodiment of the present disclosure, the apparatus may further include a prompt display module, in which:
  a prompt display module is configured to display a prompt message on the graphical user interface according to account information of the non-control account, so as to prompt the user to switch to or log out from a third game interface corresponding to the non-control account.

In an embodiment of the present disclosure, the apparatus may further include a permission acquisition module and a data update module, in which:
  the permission acquisition module is configured to control a first game character corresponding to the control account according to the second touch operation in response to a second touch operation acting on the graphical user interface;
  the data update module is configured to send control authority of the non-control account to a cloud server to automatically control a third game character corresponding to the non-control account through the cloud server.

In an embodiment of the present disclosure, the account switching module 1130 may include a data acquisition unit and an interface switching unit, in which:
  the data acquisition unit is configured to acquire game data of the target account from the cloud server and render a second game interface according to the game data;
  the interface switching unit is configured to display the second game interface on the graphical user interface to switch the first game interface to the second game interface.

In an embodiment of the present disclosure, the interface display module 1120 may include a game data acquisition unit, a message generation unit, and a message display unit, in which:
  the game data acquisition unit is configured to acquire game data of the non-control account;

the message generation unit is configured to generate a prompt message according to specific game data in the game data;

the message display unit is configured to display the prompt message on the graphical user interface, so as to prompt the user to operate the non-control account corresponding to the prompt message.

In an embodiment of the present disclosure, the device further includes an association determination module, an association information acquisition module, and an information sending module, in which:

the association determination module is configured to acquire associated information of the login accounts;

the association information acquisition module is configured to acquire the first login account associated with the target account according to the association information.

the information sending module is configured to send preset information to the first game interface corresponding to the target login account if the game data corresponding to the first login account contains the preset information.

Since each functional module of the game account control apparatus of the example embodiment of the present disclosure corresponds to steps of the embodiment of the above game account control method, details not disclosed in the embodiment of the apparatus of the present disclosure, please refer to the above embodiments of the game account control method of the present disclosure.

Figure 11:
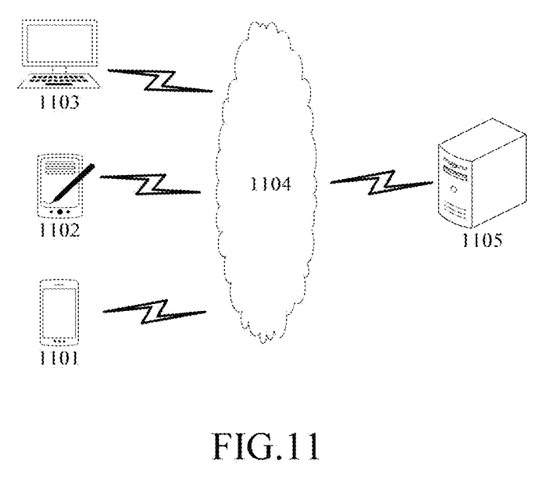
FIG. 11 schematically shows a system architecture view for implementing a game account control method according to an embodiment of the present disclosure.

Referring to FIG. 11, FIG. 11 shows a system architecture view of an exemplary application environment for a game account control method and a game account control apparatus, and the system architecture view is applicable to an embodiment of the present disclosure.

As shown in FIG. 11, the system architecture 1100 may include one or a plurality of the terminal device 1101, 1102, 1103, a network 1104, and a server 1105. The network 1104 is a non-transitory medium for providing a communication link among the terminal device 1101, 1102, 1103 and the server 1105. The network 1104 may include various connection types, such as wired communication links, wireless communication links, or fiber-optical cables.

The terminal device 1101, 1102 and 1103 may be various electronic device with display screens, including but not limited to desktop computers, portable computers, smart phones, tablet computers, etc. It should be understood that number of terminal device, networks, and servers in FIG. 11 is merely schematic, and there may be any number of terminal device, networks and servers according to implementation requirements. For example, server 1105 may be a server cluster composed of a plurality of servers.

The game account control method provided by the embodiment of the disclosure may be executed by the terminal device 1101, 1102 and 1103. Accordingly, the game account control apparatus may also be arranged in the terminal device 1101, 1102 and 1103.

Figure 12:
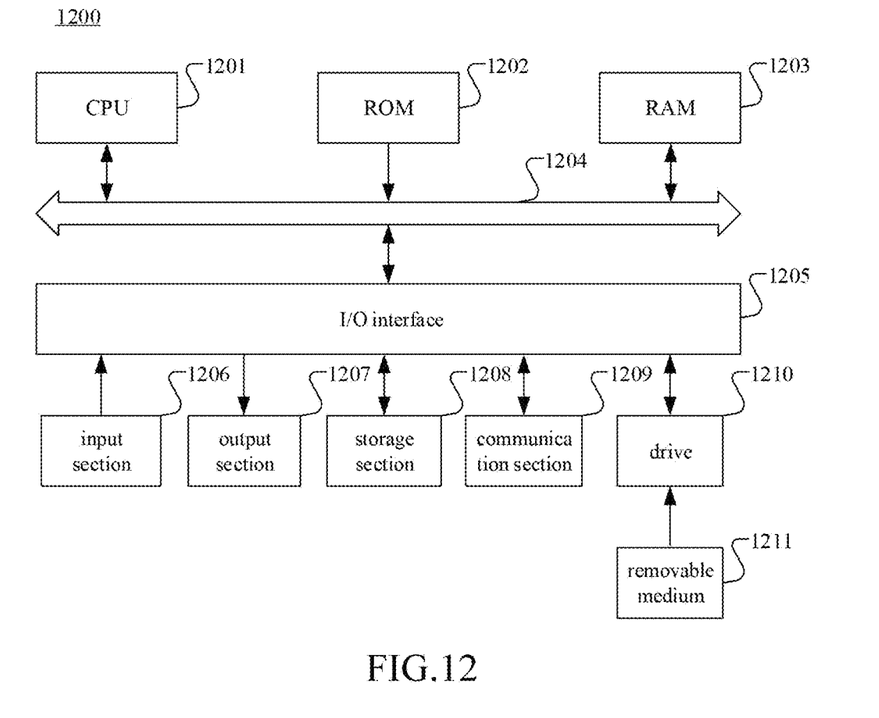
FIG. 12 shows a structural view of a computer system suitable for implementing an electronic device according to an embodiment of the present disclosure.

FIG. 12 shows a structural view of a computer system suitable for implementing an electronic device according to an embodiment of the present disclosure.

It should be noted that the computer system 1200 of the electronic device shown in FIG. 12 is merely an example and should not be construed as a limitation to functions and usage scope of the embodiments of the present disclosure.

As shown in FIG. 12, the computer system 1200 includes a central processing unit (CPU) 1201, the CPU 1200 may perform various appropriate actions and processes according to a program stored in a read-only memory (ROM) 1202 or a program loaded from storage section 1208 into a random access memory (RAM) 1203. Various programs and data required for system operation are also stored in RAM 1203. CPU 1201, ROM 1202, and RAM 1203 are connected to each other through bus 1204. Input/output (I/O) interface 1205 is also connected to the bus 1204.

The following components are connected to the I/O interface 1205: an input section 1206 including a keyboard, a mouse, etc., an output section 1207 including a cathode ray tube (CRT), a liquid crystal display (LCD) and the like as well as a speaker, etc., a storage section 1208 including a hard disk, etc., and a communication section 1209 including a network interface card such as a LAN card, a modem, etc., The communication section 1209 performs communication processing via a network such as the Internet. A drive 1210 is also connected to I/O interface 1205 as required. A removable medium 1211, such as a magnetic disk, an optical disk, a magneto-optical disk, a semiconductor memory, etc., is installed on the drive 1210 as required, such that a computer program read from the removable medium 1211 is loaded into the storage section 1208 as required.

In some embodiments, according to an embodiment of the present disclosure, process described below with reference to a flowchart may be implemented as a computer software program. For example, embodiments of the present disclosure include a computer program product including a computer program carried on a non-transitory computer-readable medium, and the computer program including program code for executing the method shown in the flowchart. In such an embodiment, the computer program may be downloaded and installed from the network through the communication section 1209, and/or installed from the removable medium 1211. When the computer program is executed by the central processing unit (CPU) 1201, various functions defined in the method and device of the present application are executed.

It should be noted that the non-transitory computer-readable medium shown in the present disclosure may be a computer-readable signal medium, a computer-readable storage medium, or any combination of the two. The non-transitory computer-readable storage medium may be, for example, but is not limited to, an electronic, magnetic, optical, electromagnetic, infrared, or semiconductor system, device, or apparatus, or any combination thereof. More specific examples of computer readable storage media may include, but are not limited to: electrical connection with one or a plurality of wires, portable disk, hard disk, random access memory (RAM), read-only memory (ROM), erasable programmable read-only memory (EPROM or flash memory), optical fiber, portable compact disc read-only memory (CD-ROM), optical storage apparatus, magnetic storage apparatus, or any suitable combination thereof. In the present disclosure, a non-transitory computer-readable storage medium may be any tangible medium containing or storing a program that may be used by or in combination with an instruction execution system, device, or apparatus. In the present disclosure, the computer-readable signal medium may include a data signal in baseband or propagated as part of a carrier wave, which carries readable program codes. Such a propagated data signal may have many forms, including but not limited to electromagnetic signals, optical signals, or any suitable combination of the above. The readable signal medium may also be any readable medium other than a readable storage medium, and the readable medium may send, propagate, or transmit a program that is used by an instruction execution system, device, or apparatus, or that is used in combination with an instruction execution system, device, or apparatus. The program code contained on the non-transitory computer-readable medium may be transmitted by any suitable medium, including but not limited to: wireless, wire, optical cable, RF, etc., or any suitable combination of the above.

The flowcharts and block diagram in the accompanying drawings illustrate the possible architectures, functions, and operations of systems, methods, and computer program products according to various embodiments of the present disclosure. In this regard, each block in a flowchart or block diagram may represent a module, program segment, or a part of code that contains one or a plurality of executable instructions for implementing a specified logic function. It should also be noted that in some alternative implementations, functions indicated in the block may also occur in a different sequence than those indicated in the drawings. For example, two contiguous blocks may actually be executed in substantially parallel, or be executed in reverse sequence sometimes, depending on the function involved. It should also be noted that each block in the block diagram or flowchart and the combination of the blocks in the block diagram or flow chart may be implemented by a dedicated hardware based system that performs a specified function or operation, or by a combination of dedicated hardware and computer instructions.

The units described in the embodiments of the present disclosure may be implemented in software or hardware, and the described units may also be arranged in the processor. In some cases, names of these units cannot constitute a limitation to the units.

On the other hand, the present disclosure further provides a non-transitory computer-readable medium, which may be included in the electronic device described in the above embodiment, or may be present separately without being installed into the electronic device. The non-transitory computer-readable medium carries one or a plurality of programs, and when the one or the plurality of programs are executed by the electronic device, the electronic device is enabled to implement the method described in the following embodiments. For example, the electronic device may implement various steps as shown in FIGS. 1 and 2.

It should be noted that although several modules or units of the device for performing actions are described in detail above, this division is not mandatory. In fact, according to the embodiments of the present disclosure, features and functions of two or more modules or units described above may be embodied in one module or unit. Conversely, the features and functions of one module or unit described above may be further divided into a plurality of modules or units to be embodied.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

It should be understood that the present disclosure is not limited to the precise structure already described above and shown in the drawings, and various modifications and changes can be made without departing from the scope of the present disclosure. The scope of the present disclosure is limited merely by the appended claims.

What is claimed is:

1. A game account control method, comprising
   acquiring account information of a plurality of login accounts, generating account-control widgets corresponding to the login accounts according to the account information, wherein the login accounts comprises a control account and a non-control account;
   displaying the account-control widgets on a graphical user interface provided through a terminal device, and displaying a first game interface corresponding to the control account;
   in response to a first touch operation acting on the account-control widget, selecting a target account from the non-control account according to the first touch operation, and switching to display a second game interface corresponding to the target account;
   in response to a second touch operation acting on the graphical user interface, controlling a first game character corresponding to the control account according to the second touch operation; and
   sending control authority of the non-control account to a cloud server, wherein the cloud server is configured to automatically control a third game character corresponding to the non-control account based on the control authority.

2. The game account control method according to claim 1, wherein displaying the first game interface corresponding to the control account comprises:
   acquiring account status data corresponding to the login accounts;
   determining the control account according to the account status data, and displaying the first game interface corresponding to the control account on the graphical user interface.

3. The game account control method according to claim 2, further comprising:
   displaying a prompt message on the graphical user interface according to the account status data, wherein the prompt message is configured to promote a user to switch to or log out from a third game interface corresponding to the non-control account.

4. The game account control method according to claim 1, wherein switching the first game interface into the second game interface corresponding to the target account comprises:
   acquiring game data of the target account from the cloud server, and rendering the second game interface according to the game data;
   displaying the second game interface on the graphical user interface.

5. The game account control method according to claim 1, further comprising:
   acquiring game data of the non-control account;
   generating a prompt message according to a preset game data in the game data;
   displaying the prompt message on the graphical user interface, wherein the prompt message is configured to prompt the user to operate the non-control account corresponding to the prompt message.

6. The game account control method according to claim 1, further comprising:
   acquiring associated information of the login accounts;
   acquiring a first login account associated with the target account according to the association information;
   in response to determining that the game data corresponding to the first login account contains preset information, sending the preset information to the first game interface.

7. A game account control apparatus, comprising:
a processor; and
a memory having computer-readable instruction stored thereon, wherein the computer-readable instructions, when executed by the processor, cause the processor to configured to:
acquire account information of a plurality of login accounts, generate account-control widgets corresponding to the login accounts according to the account information, wherein the login accounts comprises a control account and a non-control account;
display the account-control widgets on a graphical user interface provided through a terminal device, and display a first game interface corresponding to the control account;
in response to a first touch operation acting on the account-control widget, select a target account from the non-control account according to the first touch operation, and switch to display a second game interface corresponding to the target account;
in response to a second touch operation acting on the graphical user interface, control a first game character corresponding to the control account according to the second touch operation; and
send control authority of the non-control account to a cloud server, wherein the cloud server is configured to automatically control a third game character corresponding to the non-control account based on the control authority.

8. The game account control apparatus according to claim 7, wherein the processor is further configured to:
acquire account status data corresponding to the login accounts;
determine the control account according to the account status data, and display the first game interface corresponding to the control account on the graphical user interface.

9. The game account control apparatus according to claim 8, wherein the processor is further configured to:
display a prompt message on the graphical user interface according to the account status data, wherein the prompt message is configured to promote a user to switch to or log out from a third game interface corresponding to the non-control account.

10. The game account control apparatus according to claim 7, wherein the processor is further configured to:
acquire game data of the target account from the cloud server, and render the second game interface according to the game data;
display the second game interface on the graphical user interface.

11. The game account control apparatus according to claim 7, wherein the processor is further configured to:
acquire game data of the non-control account;
generate a prompt message according to a preset game data in the game data;
display the prompt message on the graphical user interface, wherein the prompt message is configured to prompt the user to operate the non-control account corresponding to the prompt message.

12. The game account control apparatus according to claim 7, wherein the processor is further configured to:
acquire associated information of the login accounts;
acquire a first login account associated with the target account according to the association information;
in response to determining that the game data corresponding to the first login account contains preset information, send the preset information to the first game interface.

13. A non-transitory computer-readable storage medium having a computer program stored thereon, wherein when executed by a processor, the computer program causes the processor to perform operations of:
acquiring account information of a plurality of login accounts, generating account-control widgets corresponding to the login accounts according to the account information, wherein the login accounts comprises a control account and a non-control account;
displaying the account-control widgets on a graphical user interface provided through a terminal device, and displaying a first game interface corresponding to the control account;
in response to a first touch operation acting on the account-control widget, selecting a target account from the non-control account according to the first touch operation, and switching to display a second game interface corresponding to the target account;
in response to a second touch operation acting on the graphical user interface, controlling a first game character corresponding to the control account according to the second touch operation; and
sending control authority of the non-control account to a cloud server, wherein the cloud server is configured to automatically control a third game character corresponding to the non-control account based on the control authority.

14. The non-transitory computer-readable storage medium according to claim 13, wherein the processor is further configured to perform the following operations of:
acquiring account status data corresponding to login accounts;
determining the control account according to the account status data, and displaying the first game interface corresponding to the control account on the graphical user interface.

15. The non-transitory computer-readable storage medium according to claim 14, wherein the processor is further configured to perform the following operations of:
displaying a prompt message on the graphical user interface according to the account status data, wherein the prompt message is configured to promote a user to switch to or log out from a third game interface corresponding to the non-control account.

16. The non-transitory computer-readable storage medium according to claim 13, wherein the processor is further configured to perform the following operations of:
acquiring game data of the target account from the cloud server, and rendering the second game interface according to the game data;
displaying the second game interface on the graphical user interface.

17. The non-transitory computer-readable storage medium according to claim 13, wherein the processor is further configured to perform the following operations of:
acquiring game data of the non-control account;
generating a prompt message according to a preset game data in the game data;
displaying the prompt message on the graphical user interface, wherein the prompt message is configured to prompt the user to operate the non-control account corresponding to the prompt message.

\* \* \* \* \*